(12) United States Patent
Buckley et al.

(10) Patent No.: US 7,975,221 B2
(45) Date of Patent: *Jul. 5, 2011

(54) METHOD FOR DOCUMENT VIEWING

(75) Inventors: Robert R. Buckley, Rochester, NY (US); Emil V. Rainero, Penfield, NY (US); James W. Reid, Fairport, NY (US); Pamela B. Spiteri, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 996 days.

This patent is subject to a terminal disclaimer.

(21) Appl. No.: 11/615,343

(22) Filed: Dec. 22, 2006

(65) Prior Publication Data

US 2007/0106819 A1      May 10, 2007

Related U.S. Application Data

(62) Division of application No. 10/042,987, filed on Jan. 11, 2002, now Pat. No. 7,284,069.

(51) Int. Cl.
*G06F 17/00* (2006.01)
(52) U.S. Cl. ........ 715/249; 715/200; 715/243; 715/250; 715/273; 715/261; 707/101
(58) Field of Classification Search .................. 715/200, 715/243, 249, 250, 273, 261; 707/101
See application file for complete search history.

(56) References Cited

U.S. PATENT DOCUMENTS

| | | | |
|---|---|---|---|
| 5,748,904 A | 5/1998 | Huang et al. | |
| 5,867,208 A | 2/1999 | McLaren | |
| 6,300,947 B1 * | 10/2001 | Kanevsky | 715/866 |
| 6,314,452 B1 | 11/2001 | Dekel et al. | |
| 6,449,639 B1 | 9/2002 | Blumberg | |
| 6,539,547 B2 | 3/2003 | Driscoll et al. | |
| 6,683,980 B1 | 1/2004 | Meier et al. | |

(Continued)

FOREIGN PATENT DOCUMENTS

EP        801359        10/1997

(Continued)

OTHER PUBLICATIONS

An Unofficial Prosecution History, Between Nov. 13, 2008 and Jan. 19, 2010 for U.S. Appl. No. 11/615,337.

(Continued)

*Primary Examiner* — Stephen S Hong
*Assistant Examiner* — David Faber

(57) ABSTRACT

A client-side handheld device requests a server to convert server-side documents into a compression format prior to transmission of said documents to the client. The server retrieves and converts the requested documents to a raster image that is then compressed according to attributes based on information received from the client device in the initial document request. Instead of having to manipulate multiple formats which the original documents are in and supported by the server, the client-side device is preferably optimized in hardware and/or software to support and otherwise take advantage of the requested compression format. The compressed document is then delivered to the client device, in whole or in part, selectively or progressively over time per individual requests prior to displaying the received data to the end-user. Depending on the requested delivery mode, server-side documents are preferably compressed using wavelet compression methods, such as the JPEG 2000 standard, known in the arts. Through such a compression format, documents of sizes (in total bytes) exceeding one or more Megabytes can be compressed down to as small as 30 kilobytes or less.

15 Claims, 4 Drawing Sheets

U.S. PATENT DOCUMENTS

| | | | |
|---|---|---|---|
| 6,690,403 | B1 | 2/2004 | Tuli |
| 6,708,309 | B1 | 3/2004 | Blumberg |
| 6,857,102 | B1 * | 2/2005 | Bickmore et al. ............ 715/205 |
| 6,874,009 | B1 | 3/2005 | Tuli |
| 7,020,845 | B1 * | 3/2006 | Gottfurcht et al. ............ 715/853 |
| 7,072,061 | B2 | 7/2006 | Blair et al. |
| 7,200,615 | B2 | 4/2007 | Eschbach et al. |
| 7,210,099 | B2 * | 4/2007 | Rohrabaugh et al. ......... 715/249 |
| 7,441,196 | B2 * | 10/2008 | Gottfurcht et al. ............ 715/740 |
| 2001/0032238 | A1 | 10/2001 | Cronin et al. |
| 2001/0041003 | A1 | 11/2001 | Grohs |
| 2001/0043355 | A1 | 11/2001 | Bando |
| 2002/0012453 | A1 | 1/2002 | Hashimoto et al. |
| 2002/0015042 | A1 | 2/2002 | Robotham et al. |
| 2002/0046261 | A1 | 4/2002 | Iwata et al. |
| 2002/0091738 | A1 * | 7/2002 | Rohrabaugh et al. ......... 707/517 |
| 2002/0161796 | A1 | 10/2002 | Sylthe |
| 2003/0014445 | A1 * | 1/2003 | Formanek et al. ............ 707/526 |
| 2003/0072299 | A1 | 4/2003 | Hunt et al. |
| 2004/0003117 | A1 | 1/2004 | McCoy et al. |
| 2004/0117358 | A1 | 6/2004 | von Kaenel et al. |
| 2004/0239681 | A1 | 12/2004 | Robotham et al. |
| 2005/0165788 | A1 | 7/2005 | Yang et al. |
| 2006/0023953 | A1 | 2/2006 | Kliorin et al. |

FOREIGN PATENT DOCUMENTS

| | | |
|---|---|---|
| EP | 0953965 | 11/1999 |
| JP | 2001273230 | 11/1989 |
| JP | HO7-325771 | 12/1995 |
| JP | 1997-09-237233 | 9/1997 |
| JP | 1998-10-341327 | 12/1998 |
| JP | H11-215331 | 8/1999 |
| WO | WO99/06991 | 2/1999 |
| WO | WO0024188 | 4/2000 |
| WO | WO0065838 | 11/2000 |
| WO | WO0072517 | 11/2000 |

OTHER PUBLICATIONS

An unofficial European Office Action dated Jan. 20, 2010 for European patent application 03250123.1 which corresponds to US Patent 7,284,069, pp. 1-7.

Unofficial file history for U.S. Appl. No. 11/615,325 between Mar. 25, 2009 and May 19, 2009.

Unofficial prosecution history of U.S. Appl. No. 11/615,325 between May 19, 2009 and Nov. 20, 2009.

Unofficial prosecution history of U.S. Appl. No. 11/615,337 between Mar. 20, 2009 and Nov. 20, 2009.

An Unofficial Office Action for European Patent Application EP 03250123.1 (Corresponding to US Patent 7,284,069), Sep. 29, 2009, pp. 1-4.

Unofficial partial Prosecution History of U.S. Appl. No. 11/615,325 as of Dec. 2, 2008.

Unofficial partial Prosecution History of U.S. Appl. No. 11/615,337 as of Dec. 2, 2008.

Unofficial partial Prosecution History of U.S. Appl. No. 11/615,359 as of Dec. 2, 2008.

US Prosecution History For Co-pending U.S. Appl. No. 11/615,319 on Aug. 31, 2008 (Co-pending U.S. Appl. No. 11/615,319 published May 10, 2007 as US-2007-0106817-A1).

US Prosecution History For Co-pending U.S. Appl. No. 11/615,325 on Aug. 31, 2008 (Co-pending U.S. Appl. No. 11/615.325 published May 10, 2007 as US-2007-0106818-A1).

US Prosecution History for Co-pending U.S. Appl. No. 11/615,337 on Aug. 31, 2005 (Co-pending U.S. Appl. No. 11/615,337 published May 24, 2007 as US-2007-0118611-A1) ).

US Prosecution History for Co-pending U.S. Appl. No. 11/615,359 on Aug. 31, 2008 (Co-pending U.S. Appl. No. 11/615,359 published May 24, 2007 as US-2007-0118612-A1).

Despande, S.; Zeng, W.; HTTP Streaming of JPEG2000 Images (XP-002193324); Shaft Laboratories of America, 0-7695-1062-1/01, 2001 IEEE, pp. 15-19.

Pulsifer, A.; Advanced Imaging (Cover Story), May 2001, Article entitled JPEG 2000 has Arrived.

Unofficial partial Prosecution History of U.S. Appl. No. 11/615,325 as of Mar. 25, 2009.

Unofficial partial Prosecution History of U.S. Appl. No. 11/615,337 as of Mar. 25, 2009.

Unofficial partial Prosecution History of U.S. Appl. No. 11/615,359 as of Mar. 20, 2009.

Prosecution History for US 7,284,069. Current application is a Divisional application of US 7,284,069.

An unofficial prosecution history of U.S. Appl. No. 11/615,319 between Sep. 5, 2008 and Oct. 29, 2009.

Kawabata, Y.; DB System of Era of Windows 2000; DB Magazine, vol. 9, No. 5, Japan, Mar. 1, 2000, p. 65, p. 60-67 were provided.

Kawabata, Y.; DB System of Era of Windows 2000; DB Magazine, vol. 9, No. 5, Japan, Mar. 1, 2000, p. 65—Translation of page.

JP H11-215331 Abstract and Machine Translation.

JP HO7-325771 Abstract and Machine Translation.

* cited by examiner

METHOD FOR DOCUMENT VIEWING

PRIORITY INFORMATION

This application is a divisional application of U.S. patent application Ser. No. 10/042,987, filed on Jan. 11, 2002, now U.S. Pat. No. 7,284,069. This application claims priority, under 35 U.S.C. §120, from co-pending U.S. patent application Ser. No. 10/042,987, filed on Jan. 11, 2002. The entire content of U.S. patent application Ser. No. 10/042,987, filed on Jan. 11, 2002, is hereby incorporated by reference.

BACKGROUND

In the arts, many client-side devices communicate with a server either through a direct connection such as a phone line or a cable or via a remote connection, such that the end-user (operating the client-side device) can retrieve email, documents, pictures, and other text or pictures made available to the client by the server. Depending on the type or kind of connection the user has made with the server device, the transfer of documents from the server to the client can be relatively quick in those instances wherein the client is connected to the server through a high bandwidth connection, or can be painstakingly slow if, for example, the client is connected to the server through a low bandwidth connection. The server merely receives the request from the client device and then retrieves the desired pages or other documents or pictures and routinely queues them up for transfer to the requesting client. Depending on the bandwidth of the client-server communication pathway, the transfer of documents from a server to a remote client can take quite a long time which increases, for example, the risk of having the connection-link severed during the extended transmission time frame or leads to a poor user experience.

Today, many client-side devices are handheld devices, as illustrated in FIG. 1, with relatively small viewing screens for displaying documents. (All trademarks are owned by their respective organizations.) Users can connect to a server via a wireless protocol and request work-related documents and email for viewing while away from the office. Since many of these small handheld devices have very limited internal size, they routinely lack sufficient memory and/or storage room to hold all of the requested documents or document applications/viewers at any one moment in time. In addition, such handheld client-side devices can be limited in the processing power needed to convert such documents for display on the limited real estate of the handheld device's viewing screen.

As such, one of the problems in the art of client-side document viewing involves the combination of accessing remote documents over a low bandwidth connection using a client-side device with relatively limited screen real estate, coupled with insufficient internal memory to store a large set of retrieved documents and document applications, and often lacking adequate computing power to convert such documents on-the-fly into another format for faster displaying on the user's viewing screen. Current solutions often restrict the amounts and/or types of documents that can be viewed (e.g. web pages with GIF files) by such remote handheld document viewing devices. What is needed in the arts is a method by which a low-bandwidth client-side device can request from a remote server documents in a certain format.

What is needed in the arts is a method by which such a client-side handheld device can take advantage of the often considerable computing power of the server to convert requested documents into a format with compression in order to speed up transmission times while gaining the benefit of having a smaller document (in terms of total bytes) to manipulate client-side prior to displaying on the limited real estate screen for the user.

A client-side handheld device requests a server to convert server-side documents into a compression format prior to transmission of said documents to the client. The server retrieves and converts the requested documents to a raster image that is then compressed according to attributes based on information received from the client device in the initial document request. Instead of having to manipulate multiple formats which the original documents are in and supported by the server, the client-side device is preferably optimized in hardware and/or software to support and otherwise take advantage of the requested compression format. The compressed document is then delivered to the client device, in whole or in part, selectively or progressively over time per individual requests prior to displaying the received data to the end-user. Depending on the requested delivery mode, server-side documents are preferably compressed using wavelet compression methods, such as the JPEG 2000 standard, known in the arts. Through such a compression format, documents of sizes (in total bytes) exceeding one or more Megabytes can be compressed down to as small as 30 kilobytes or less.

More specifically, a client side device requests a document or a portion of a document from a server and the server receiving said request. Secondly, the server retrieves the requested document portion and converts said portion to a wavelet compressed image. The server sends packets of data from the wavelet compressed page image to the client. The client receives the compressed data; decompresses it and displays the decompressed document for the user. The client makes subsequent requests for more data which the server responds to using the wavelet compressed image data for the document. All these requests and responses use a protocol appropriate to document viewing and the features of the wavelet compression. The wavelet compression may be compliant with the JPEG 2000 standard.

BRIEF DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which.

DETAILED DESCRIPTION OF THE INVENTION

What is disclosed is a method by which a client-side handheld device requests server-side documents from a server which the server converts into a compression format prior to transmission of said documents to the client. The server retrieves and converts the requested documents, if they have not been previously converted, to a raster image that is then compressed according to attributes based on information received from the client device in the initial document request. Instead of the having to manipulate multiple formats which the original documents are in and supported by the server, the client-side device is preferably optimized in hardware and/or software to support and otherwise take advantage of the requested compression format. The compressed document is then delivered to the client device, in whole or in part, selectively or progressively over time per individual requests prior to displaying the received data to the end-user. Depending on the requested delivery mode, server-side documents are preferably compressed using a wavelet compression method, such as the JPEG 2000 standard, known in the arts. Through such a compression format, documents of sizes (in total bytes) exceeding one or more Megs can be compressed down to as small as 30 kilobytes or less.

A client side device requests a document from a server in a particular compression format and the server receiving said request. Secondly, the server retrieves the requested document portion and converts said portion to a JPEG 2000 compressed image. The server sends as much of the JPEG 2000 compressed page image data to the client as is needed to satisfy the client request. The client receives the compressed data; decompresses it and displays the decompressed document for the user. The client makes subsequent requests for more data which the server responds to using the JPEG 2000 compressed image data. All these requests and responses use a protocol appropriate to document viewing and the features of the JPEG 2000 compression.

Figure 1:
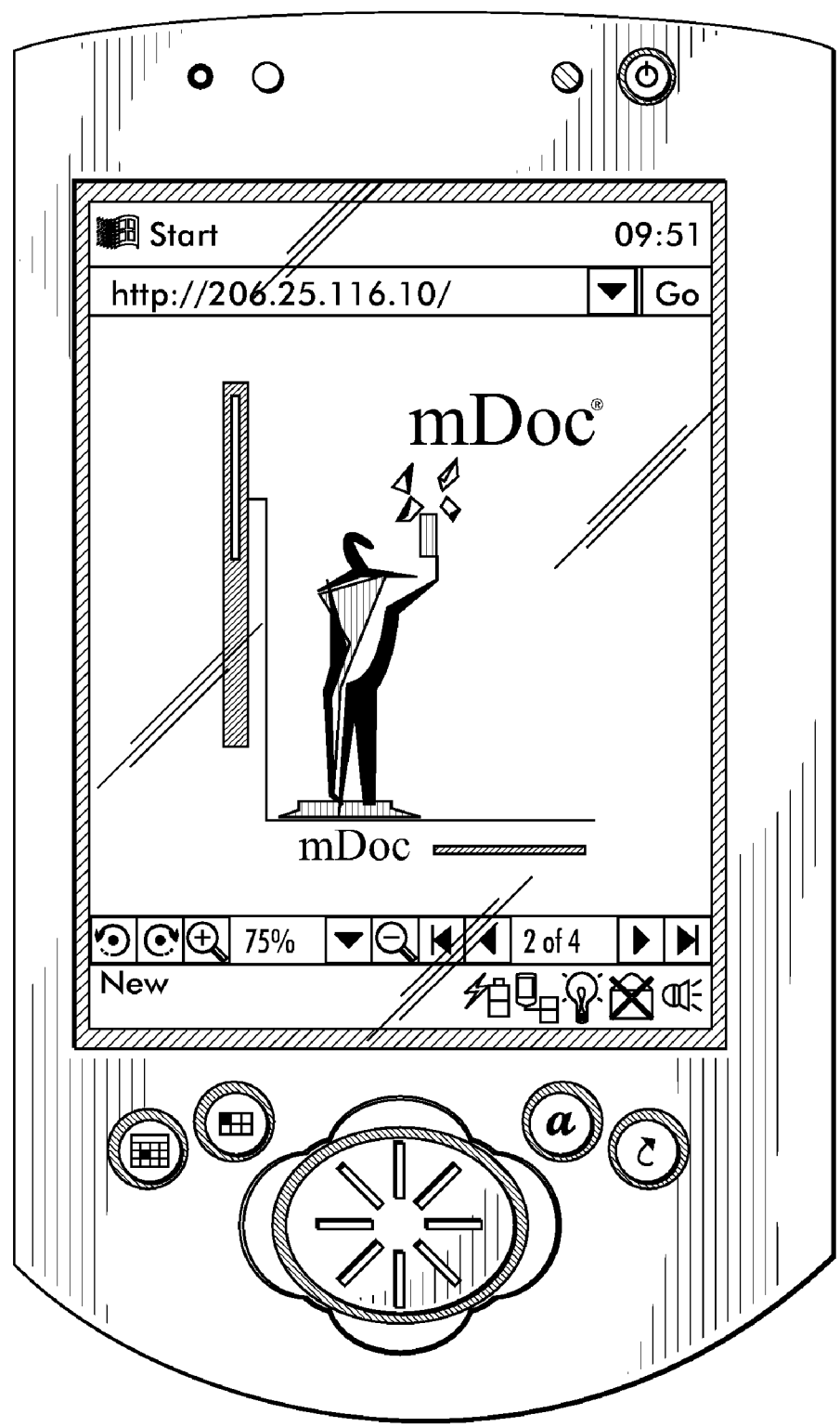
FIG. 1 is an illustration of one such client-side hand held device known in the arts.

A user has a handheld device, as shown in FIG. 1, with limited screen or viewing real estate (in many instances, these handheld devices also have limited internal memory and computing power) and the user wishes to view some of his or her documents residing on a server in a remote location. For example, the user may want to look up something specific in a particular document, or verify that they have the correct document before printing, faxing or e-mailing it onward. The viewing device has limited memory, and lacks the computing power necessary to render on-the-fly documents from one format to another prior to viewing. Handheld devices have little screen real estate and typically operate over a relatively low bandwidth connection. The end-user would first download the entire document then open, reformat, rasterize, zoom, scroll, and pan—all the operations you normally perform on a desktop system with a regular-size monitor. However, these operations typically do not map well to the small screens of a handheld device.

Preferably, the client-side device is optimized in hardware and/or software to support and otherwise take advantage of a particular compression format such that the handheld device is merely an image viewer and, in particular, a wavelet-based image viewer, preferably one compliant with the JPEG 2000 standard.

The JPEG 2000 code stream is organized into packets whose ordering represents one of multiple possible different groupings of the compressed data structures. This means that as more packets are received and decompressed, more of the image can be viewed. The particular grouping determines how the image progresses, by spatial resolution and by quality (bit resolution) being the two main progressive modes. In addition, region-of-interest coding can be used for that some of portions of the page image appear with higher quality before other parts of the page image. In addition compressed image data can be tiled, so that rectangular subsets of the compressed image can be accessed independently of other subsets. There are other benefits to using the preferred JPEG 2000 standard.

Figure 2:
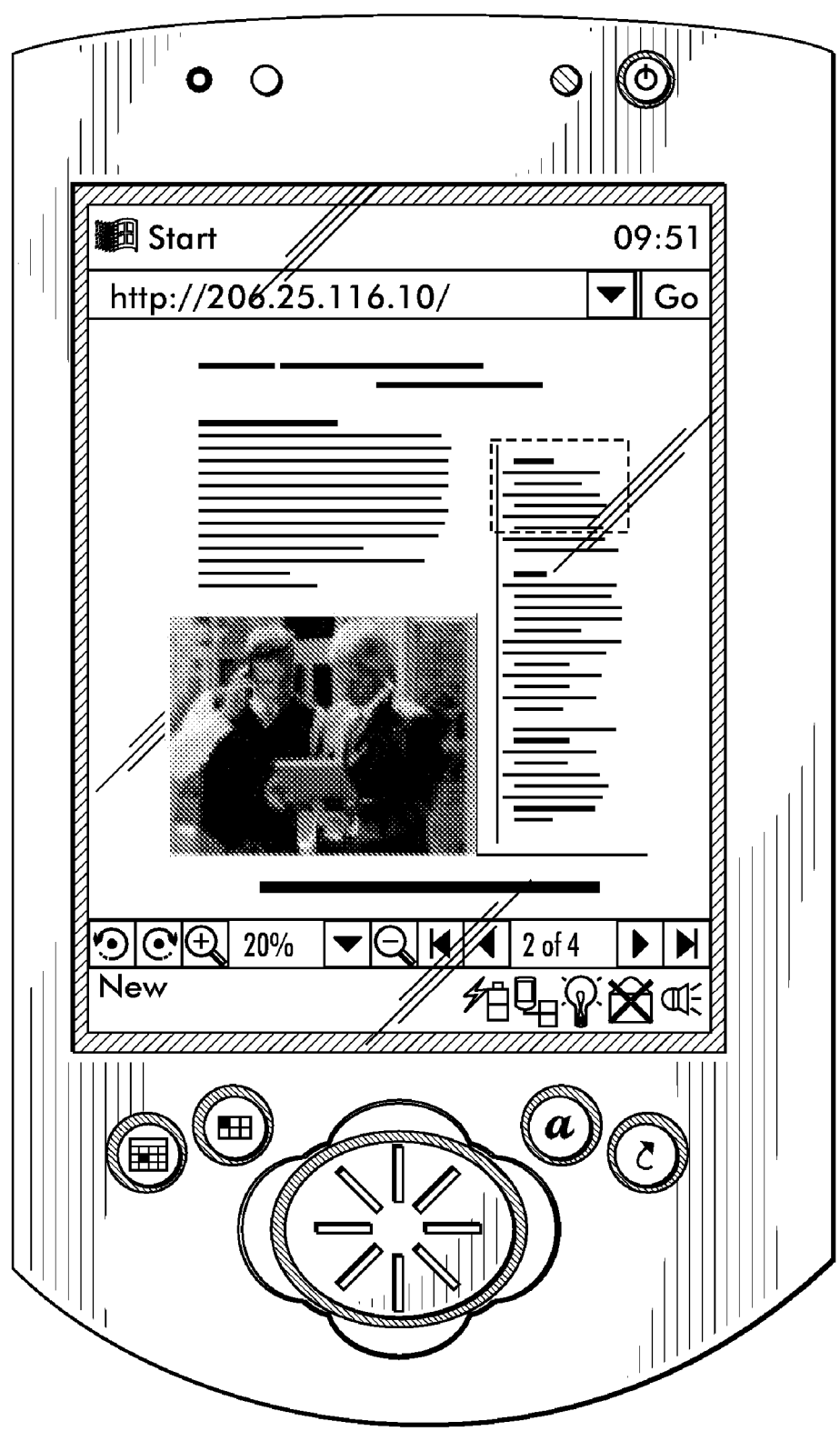
FIG. 2 illustrates the hand held device of FIG. 1 displaying a combination of text and graphics with a portion thereof having been selected by the user.

When the user requests a document using the user-interface (UI) on the handheld client, as shown in FIG. 1, the client device makes a request to the server on which the document resides. The server retrieves the document and converts each page to a JPEG 2000-compressed image. All pages can be converted, or just the page needed to satisfy the initial request, or the page requested along with the pages preceding and following it. Additional strategies are envisioned herein. The page images may also be cached or pre-computed. The server then responds to the client request with an initial image, typically a high decomposition level, low resolution image in a JPEG 2000 code stream or a low quality image (most significant layers in a JPEG 2000 code stream) of the requested page. The initial image would usually be in color, but a gray-only image could be initially sent The client may receive the decompressed data and then decompresses and displays it as shown in FIG. 2. In some circumstances, the size of the received compressed image (in bytes) may be larger than the size of the image (in bytes) that is to be rendered on the display. In such instances the server can decompress, compute, and send a portion or segment of the image to be displayed to the client device. Depending on transmission and decompression times, the user may be able to stop the progressive rendering of the document image on the display by deciding that they have seen enough and that further transmission or decompression will not provide any more useful data.

Figure 3:
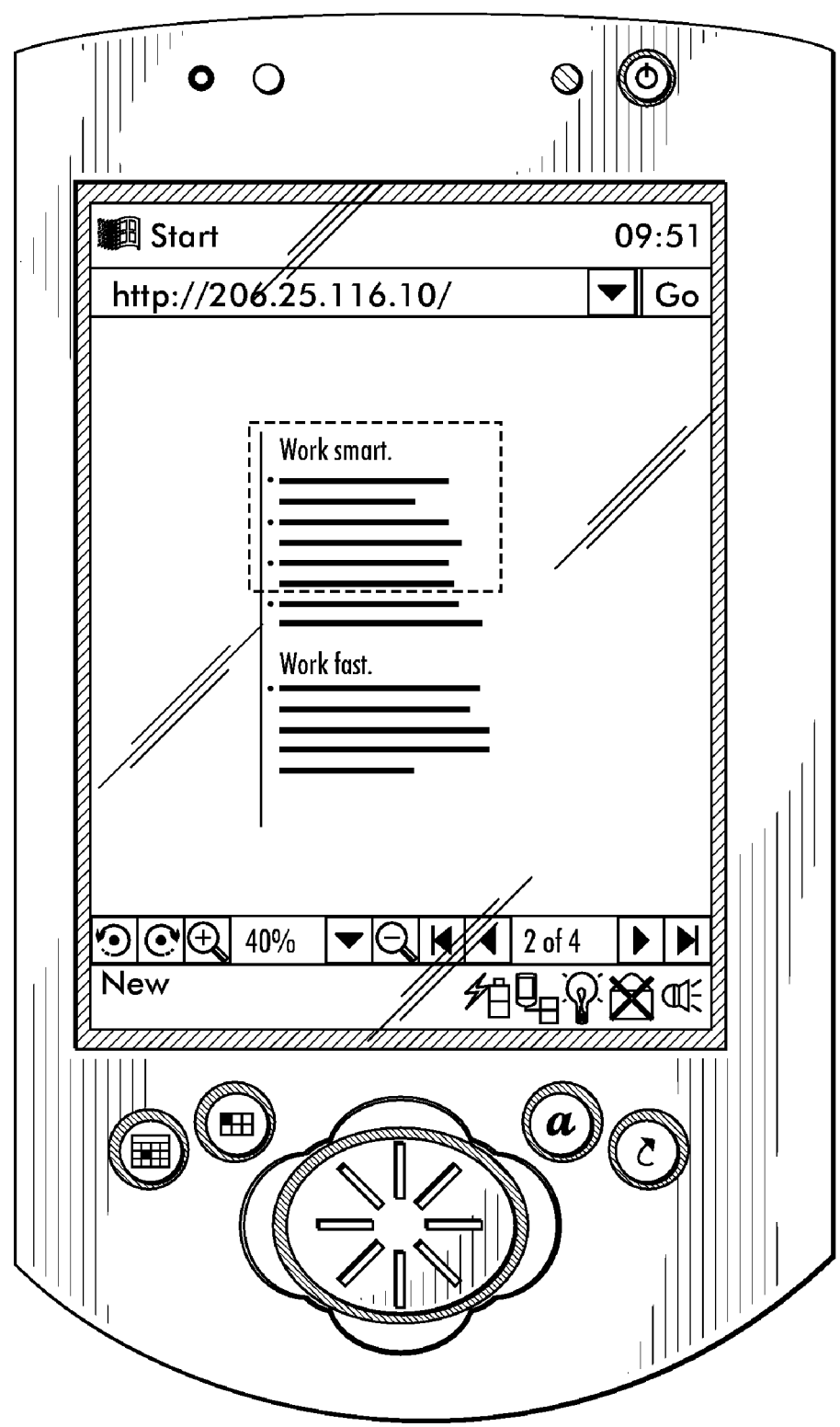
FIG. 3 shows the portion of the text of FIG. 2, selected by the user being displayed with a subset of that text again being specifically selected.
Figure 4:
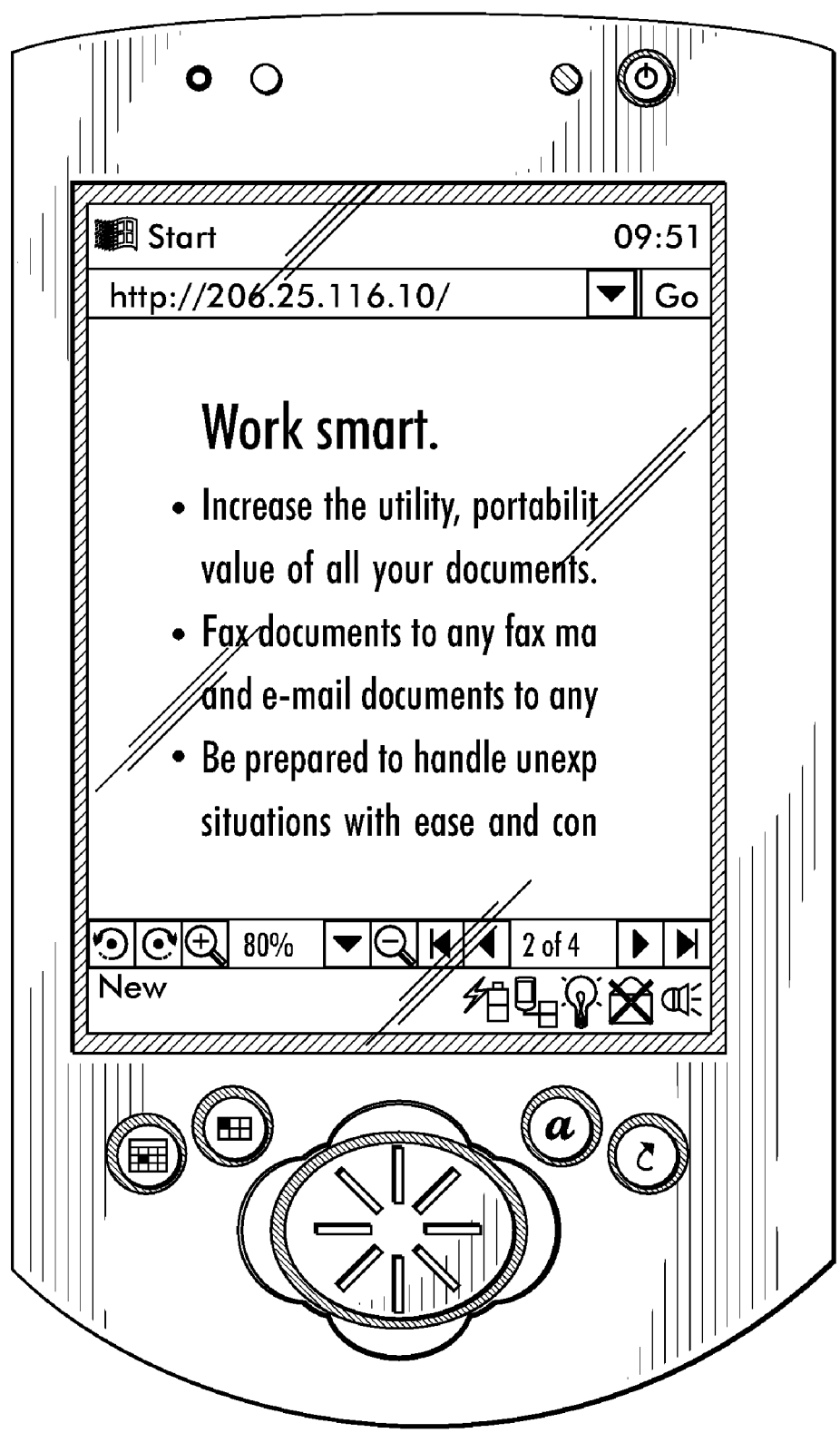
FIG. 4 shows the selected text of FIG. 3 displayed.

After the initial view, the user can then request more data from the current page image—more resolution, in effect zooming in; more quality to refine the viewed image; or full color—or the user can request another page. As shown in FIG. 2, the user could also select a region of the page image, identify that region in a request to the server, and then receive from the server the data that is needed to provide a higher resolution view of that region. In other words, the server sends data for only a portion of the image. All these requests would be satisfied by the server providing the appropriate packets from the JPEG 2000-compressed version of the page image that resides on the server. FIG. 3 shows another page of the same document in FIG. 2; and FIG. 4 shows the resulting displays when the user zooms in on a portion of a page. Note that the zooming is satisfied by additional data, namely resolution levels, in combination with data previously received. After all resolution levels have been received, subsequent zooming would interpolate the received data.

Since the JPEG 2000 standard supports ROI (Region-of-Interest) coding, some portions of an image can be compressed with more fidelity and higher resolution. In addition, certain regional packets for selected portions of the image can be manipulated in the codestream prior to transmission such that they occur earlier in the codestream and thus are delivered before the arrival of packets for other regions of the image. JPEG 2000 ROI coding can be used in the initial image that the server delivers to the client so that the image bits initially received show more detail in the areas of the page that are determined to be more interesting or significant. The ROI can be defined in several ways: predefined for each page of the document (the ROI or the rules for defining it are predefined), determined from an analysis of the page when the JPEG 2000 image is created, or in response to an attribute in the client request, e.g. "I'm interested in the text more than the images."

Aside from different progressive modes realized by reordering the packets in an existing JPEG 2000 codestream, the present invention preferably would be supported by a client-server communication protocol which supports requests for more resolution, more quality, more color or gray, and others. The protocol preferably would support attributes that determine how the page image is compressed, e.g. to support progressive-by-resolution transmission and display. Also, the page image may be compressed so that the highest decomposition level (lowest resolution) corresponds to the display size of the requesting client. Because of the packet nature of the JPEG 2000 codestream, the client can also request an image of a specified size in kilobits, either to set the transmission time or to accommodate some memory constraints.

In summary, what is disclosed are embodiments of a method by which client-side handheld device can take advantage of the computing power of the server to convert requested documents, or portions thereof, into a wavelet compression format in order to speed up transmission times while gaining the benefit of having a smaller document (in terms of total bytes) to manipulate client-side prior to displaying on the limited real estate screen of the user's client-side handheld device.

While the invention is described with reference to a particular embodiment, this particular embodiment is intended to be illustrative, not limiting. Various modifications may be made without departing from the spirit and scope of the invention as defined in the amended claims. Modifications and alterations will occur to others upon reading and understanding this specification; therefore, it is intended that all such modifications and alterations are included insofar as they come within the scope of the appended claims or equivalents thereof.

What is claimed is:

1. A method for viewing, on a client-side device having a display, documents requested from a server-side device, the client-side device and server-side device having a communication link therebetween, comprising:
   (a) generating a request from the client-side device to be sent to the server-side device, the request identifying a document;
   (b) the server-side device retrieving, in response to receiving the request from the client-side device, the requested document;
   (c) the server-side device compressing, using a compression format compatible with the client-side device, the retrieved document into a compressed image;
   (d) the server-side device communicating a decompressed image to the client side device when a size of the compressed image is greater than a size of an image rendered on the display; and
   (e) the client-side device displaying the decompressed image.

2. The method as claimed in claim 1, wherein the compression format corresponds to a multi-resolution compression.

3. The method as claimed in claim 2, wherein the multi-resolution compression is done in accordance with a JPEG2000 standard.

4. The method as claimed in claim 1, wherein the communication link between the client-side device and the server-side device is wireless.

5. The method as claimed in claim 1, wherein said client-side device is a handheld device.

6. The method as claimed in claim 1, further comprising:
   (g) the server-side device determining the compression format compatible with the client-side device.

7. A method for viewing, on a client-side device having a display, documents requested from a server-side device, the client-side device and server-side device having a communication link therebetween, comprising:
   (a) generating a request from the client-side device to be sent to the server-side device, the request identifying a document, and a section of the document to be sent to the client-side device;
   (b) the server-side device rasterizing the requested document;
   (c) the server-side device compressing, using a compression format compatible with the client-side device, the rasterized requested document into a compressed image;
   (d) the server-side device selecting a section of the compressed image corresponding to the requested section of the requested document;
   (e) the server-side device communicating a decompressed image to the client side device when a size of the compressed image is greater than a size of an image rendered on the display; and
   (f) the client-side device displaying the decompressed image.

8. The method as claimed in claim 7, wherein the compression format corresponds to a multi-resolution compression.

9. The method as claimed in claim 8, wherein the multi-resolution compression is done in accordance with a JPEG2000 standard.

10. The method as claimed in claim 7, wherein the communication link between the client-side device and the server-side device is wireless.

11. The method as claimed in claim 7, wherein said client-side device is a handheld device.

12. The method as claimed in claim 7, further comprising:
    (h) the server-side device determining the compression format compatible with the client-side device.

13. The method as claimed in claim 7, wherein the requested section of the requested document is a page of the requested document.

14. The method as claimed in claim 7, wherein the requested section of the requested document is a number of pages of the requested document, the number of pages being less than all the pages of the requested document.

15. The method as claimed in claim 7, wherein the requested section of the requested document is a portion of a page of the requested document.

* * * * *